United States Patent

[11] 3,632,962

[72] Inventor Victor B. Cherniak
1057 Madison Ave., Chula Vista, Calif. 92011
[21] Appl. No. 19,874
[22] Filed Mar. 16, 1970
[45] Patented Jan. 4, 1972

[54] COOKING APPARATUS
9 Claims, 10 Drawing Figs.
[52] U.S. Cl.................................................. 219/200, 99/358, 219/428
[51] Int. Cl.................................................. H05b 1/00
[50] Field of Search........................................ 219/200, 201, 428; 99/332, 358

[56] References Cited
UNITED STATES PATENTS
3,098,426 7/1963 Lee, Sr. .......................... 99/358 X
3,099,202 7/1963 Palmer .......................... 99/358 X Primary Examiner—C. L. Albritton
Attorney—Carl R. Brown ABSTRACT: Cooking apparatus in which food is cooked between upper and lower conductive plates, from which electrical current is applied directly through the food for very rapid cooking. The plates are contained in protective housings and a safety interlock switch is provided, together with means for selecting AC or DC current. Radiant heating means is also included for searing meat or other foods when required. The plates are readily removable for cleaning, or disposable inserts can be used, to ensure consistently good conductivity between the plates and the food.

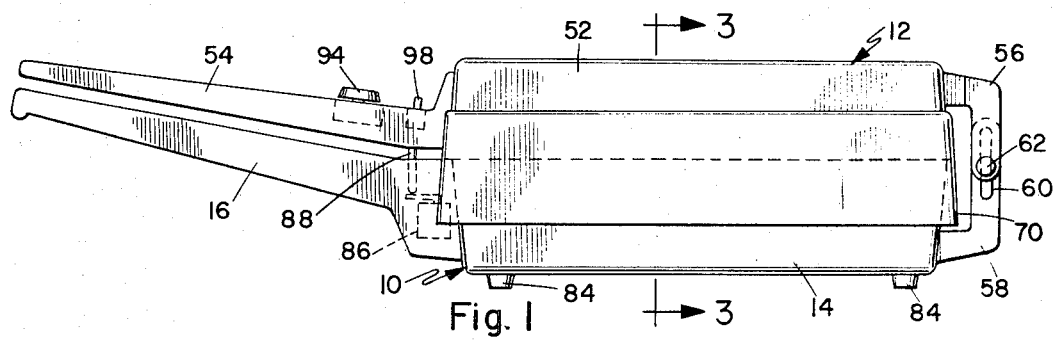
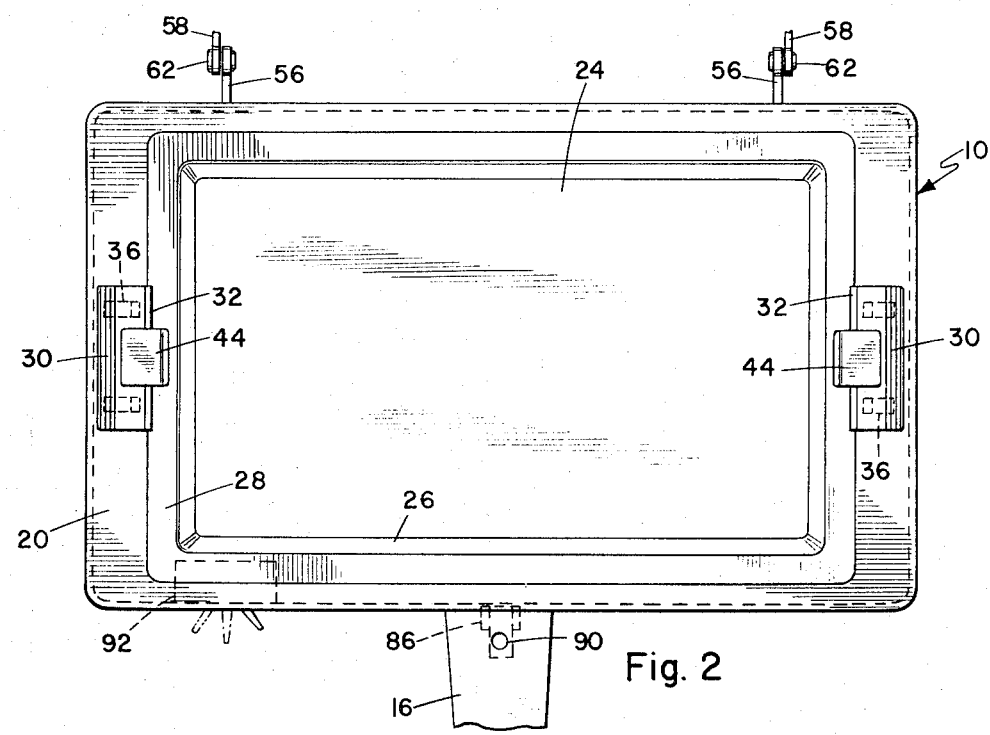
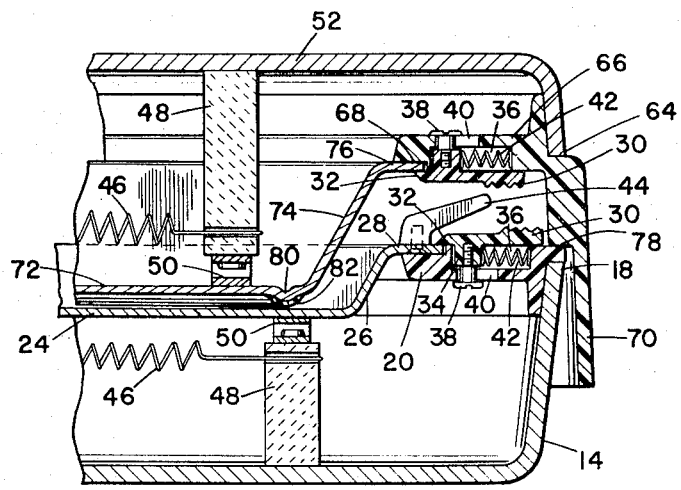
INVENTOR.
VICTOR B. CHERNIAK
BY
Carl R. Brown
ATTORNEY INVENTOR.
VICTOR B. CHERNIAK
BY
Carl R. Brown
ATTORNEY

PATENTED JAN 4 1972

INVENTOR.
VICTOR B. CHERNIAK
BY
*Carl R. Brown*
ATTORNEY

COOKING APPARATUS

BACKGROUND OF THE INVENTION

Cooking of food by passing electrical current directly through the food is well known, the cooking being very rapid. Since meat cooked by this process is not seared or browned in the short cooking time, heaters have also been used in combination with the direct application of electrical power to brown the surfaces. With such rapid cooking, timing is important to ensure consistent results, and good conductivity between the electrodes and the food is essential. In previous apparatus the structures and mechanisms have been complex and the electrodes are usually enclosed or built in, making cleaning difficult. It has been found that the juices deposited on the electrodes from cooking one or two items can have a considerable effect on conductivity and cause an unpredictable variation in cooking time. Accessibility and ease of cleaning the electrodes is thus very important.

SUMMARY OF THE INVENTION

The cooking apparatus described herein comprises an upper housing and a lower housing hinged together, and each having a conductive plate electrode held in an insulated mounting. The plates are held securely by quickly releasable catches and are readily removable for cleaning. A safety interlock switch is incorporated into the structure for positive shutoff of power when the unit is open, and a protective skirt enclosed the periphery when the unit is in use, and an insulated stop prevents direct contact and short circuiting between the electrodes. Interchangeable plates are used for cooking various foods and AC or DC current may be selected. The lower plate is dished or recessed, and disposable conductive trays may be inserted for individual food items to avoid repeated cleaning of the plate itself. For browning or searing meat, heating elements are mounted in the housings adjacent the plate electrodes and are controlled by a convenient selector switch.

The primary object of this invention, therefore, is to provide new and improved cooking apparatus.

Another object of this invention is to provide new and improved cooking apparatus having readily accessible and removable plate electrodes, between which food is cooked by direct passage of electric current through the food.

Another object of this invention is to provide new and improved cooking apparatus in which various plate electrodes, including disposable types, are easily inserted for specific uses.

A further object of this invention is to provide new and improved cooking apparatus which is very simple in construction and operation and is safe to use.

Other objects and many advantages of this invention will become more apparent upon a reading of the following detailed specification and an examination of the drawings wherein like reference numerals designate like parts throughout and in which:

BRIEF DESCRIPTION OF THE DRAWINGS

FIG. 1 is a side elevation view of the completed apparatus.

FIG. 2 is a top plan view of the lower unit.

FIG. 3 is an enlarged fragmentary sectional view taken on line 3—3 of FIG. 1.

DESCRIPTION OF THE PREFERRED EMBODIMENT

Figure 4:
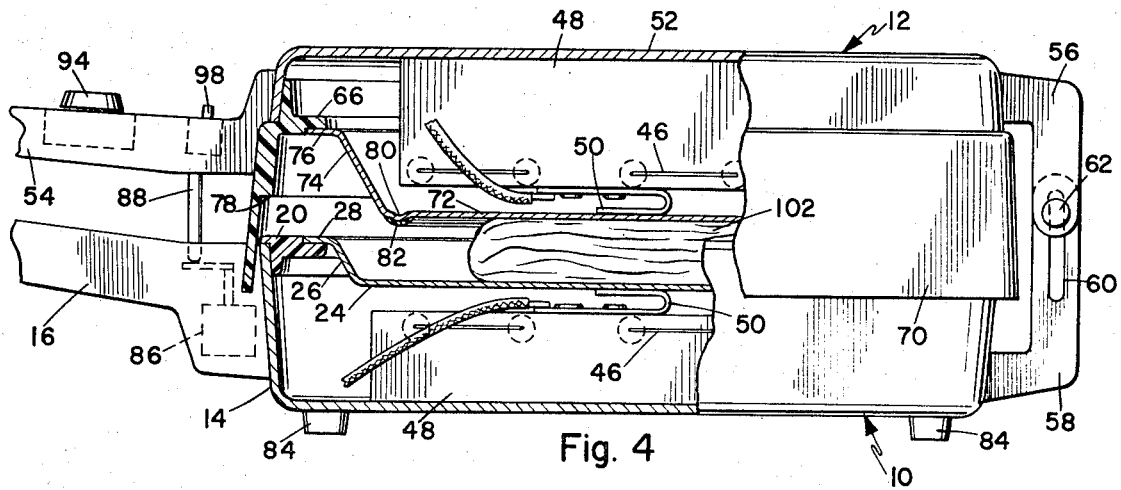
FIG. 4 is an enlarged side elevation view, partially cut away to show a food product in cooking position.

In the basic form shown in FIGS. 1–4, the cooker comprises a lower unit 10 and an upper unit 12, which fits over the lower unit. The lower unit 10 has a housing 14 in the form of a generally rectangular, deep panlike element, with a handle 16 fixed to one side. Fixed to the upper rim 18 of the housing 14 is a peripheral frame 20 of insulative material, such as heat-resistant plastic, the frame having a shallow recessed shoulder 22 around its entire periphery. The frame 20 supports a lower plate electrode 24, having an upwardly extending wall 26 and peripheral flange 28, which rests on the shoulder 22. Plate 24 is thus a shallow tray or pan for holding food to be cooked and to contain the juices, and may be of stainless steel or other such material for ease of cleaning and resistance to corrosion.

At each end of frame 20 is a retaining catch 30 slidable on top of the frame and having an extended tongue 32 which fits over flange 28 and holds the plate 24 in place. Catch 30 has projecting plug portions 34 which ride in elongated sockets 36 in the frame 20 and are held by retaining screws 38 through slots 40 in the underside of the frame, as in FIG. 3. The catch is biased inwardly toward the flange 28 by springs 42 between plug portions 34 and the outer ends of sockets 36. For ease of removal, the plate 24 is provided with small handles 44 on flange 28.

Inside housing 14 are heating elements 46 mounted on insulated supports 48, of ceramic or similar material. Coiled heating elements are shown, but Calrods could be used. Fixed on top of supports 48 are spring contacts 50, which make the plate 24, the catches 30 holding the plate in secure contact. If for some uses the heating elements are not used, the spring contacts can be supported in any suitable manner. Details of the electrical wiring are omitted, since the arrangements are well known.

The upper unit 12 has a rectangular inverted panlike housing 52, with a handle 54 which is coextensive with handle 16 in the closed position of the cooker. Projecting from the rear of housing 52 are hinge elements 56 and extending upwardly from housing 14 are hinge brackets 58 with vertically elongated slots 60. Hinge elements 56 have hinge pins 62 which are slidable in slots 60, so that the upper unit is vertically adjustable and can swing upwardly and rearwardly to an open position. This type of hinge is well known in waffle irons and similar appliances.

Fixed to the lower rim 64 of housing 52 is a peripheral frame 66 with a recessed shoulder 68, similar to frame 20. Frame 66, however, has a downwardly extending peripheral skirt 70, which fits over the lower unit and completely shields the interior of the cooker for safety when in use. Mounted in the frame 66 is an upper plate electrode 72 having an upwardly extending wall 74 with a peripheral flange 76, which seats in shoulder 68. Upper plate 72 is thus a downwardly dished panlike element which fits into lower plate 24. To limit downward travel of the upper unit 12 and prevent direct contact and short circuiting between the upper and lower electrodes, skirt 70 has an internal stop shoulder 78 which rests on lower frame 20, as in FIG. 3. Since clearances may not be precise, due to manufacturing tolerances and minor distortions during use, the upper plate has a downwardly protruding peripheral bead 80 covered by an insulative sheath 82, of heat-resistant material such as Teflon or the like. The insulated bead will touch the lower plate and prevent direct contact between the electrodes. Upper plate 72 is held in place by catches 30, mounted in frame 66 and similar in all respects to the catches described above. The upper housing 52 also contains heating elements 46 mounted on supports 48, with spring contacts 50 engaging upper plate 72.

Figure 5:
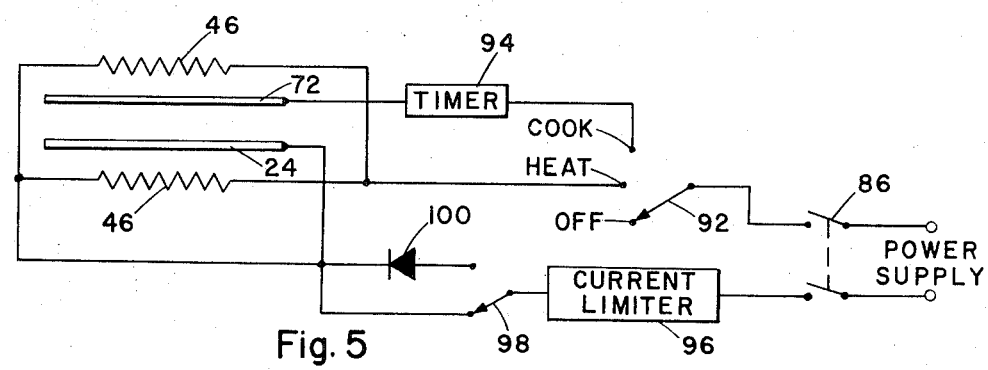
FIG. 5 is a wiring diagram of the apparatus.

As shown, the cooker is a portable tabletop type and may be provided with supporting feet 84 under lower housing 14. The handles 16 and 54 facilitate carrying and opening and closing. The electrical circuit, shown in FIG. 5, is simple and includes a safety interlock switch 86 across the power supply, the switch being installed in handle 16. To prevent operation of the switch 86 when the cooker is open, handle 54 has an actuating pin 88 which must fit through a small opening 90 in handle 14, to operate the switch only when the handles are brought together. The switch has a suitable range of travel in the closed or ON position, to accommodate the vertical variation in position of the upper unit. A three position selector switch 92 connects the power supply to the heating elements 46, or across the plates 24 and 72, or OFF. Since cooking times are very short, a timer 94 is preferably installed in the circuit to the plates and may be mounted in handle 54 for convenience.

A current limiter 96 is installed in the power supply circuit for added safety and, in series with the current limiter is a switch 98 for selection of alternating current from the power supply, or direct current through a diode 100. Switch 98 is also shown mounted in handle 54 for convenience. For a larger cooker of commercial type, other handles might be used and the controls could be located in any suitable manner.

In operation, the cooker is opened and the item to be cooked, such as a steak, pattie, or the like, is placed on the lower plate 24. The upper unit 12 is then closed, holding the food product 102 between plate electrodes 24 and 72. If browning or searing is required, the selector switch 92 is turned to heat to activate the heating elements 46. After sufficient heating, or if no heating is required, the selector switch is turned to the cook position, causing current from the power supply to pass directly through the food product. Cooking time is very short, on the order of 5 to 20 seconds, depending on the size of the food product and the degree of cooking required. Cooking is even throughout the product, with little loss of juices and with virtually no smoke or odor. The cooking stops when the timer shuts off, or when the upper unit is raised, the interlock switch 86 ensuring that the plate electrodes are safely disconnected from the power supply when the cooker is opened, regardless of the position of selector switch 92.

Good electrical contact is essential to proper cooking since cooking time is so short, and any added resistance caused by juices and residue of food on the plates will have a pronounced effect on the time. This has been a major problem of other cookers which pass current through the food. Most of the juices accumulate in the lower plate, the upper plate requiring less cleaning. If more than wiping is required, either plate is readily removable by pulling out catches 30, the spring contacts 50 causing the released plate to be lifted slightly so that the edges can be gripped. When the heating elements are not used, the plates do not become very hot and are easily handled, but the handles 44 on the lower plate are useful when the plate is hot.

Figure 6:
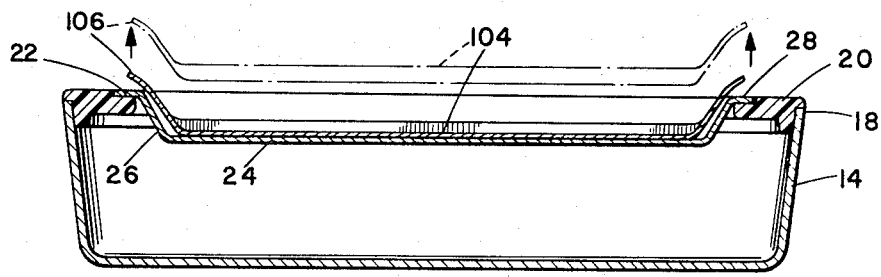
FIG. 6 is a sectional view of the lower unit, showing a disposable insert.

As an alternative to cleaning the lower plate regularly, a disposable tray 104 may be used, as in FIG. 6, the tray being pressed from heavy aluminum foil or similar low-cost material capable of making suitable electrical contact. The tray 104 is shown as having extended end tabs 106 for lifting and may be used as an individual serving tray.

Figure 7:
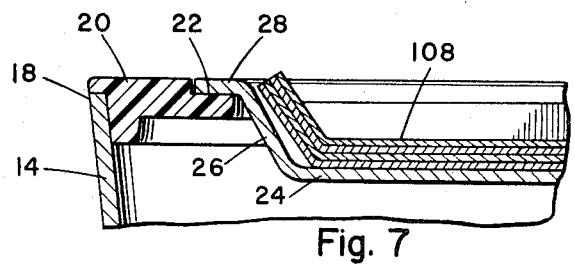
FIG. 7 is an enlarged fragmentary sectional view showing staked or laminated disposable inserts.

Another alternative is to use stacked or laminated trays 108 of metal foil, as in FIG. 7, the top tray containing the food being peeled off after cooking leaving a clean tray exposed.

Figure 8:
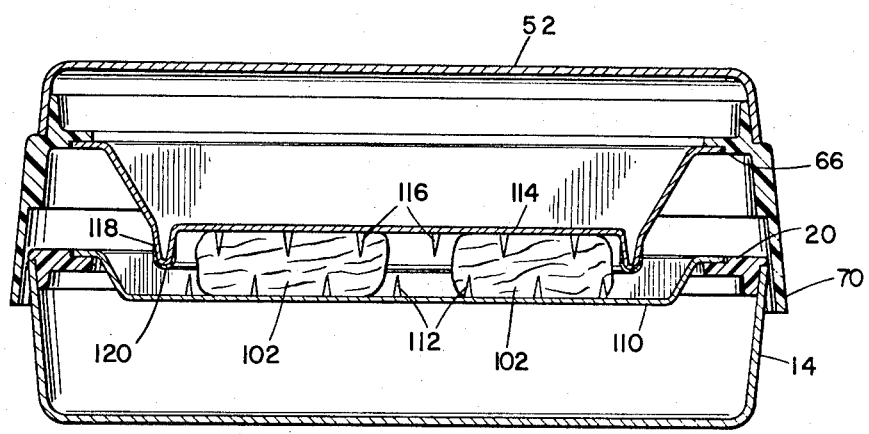
FIG. 8 is a sectional view showing an alternative type of plate electrodes.
Figure 9:
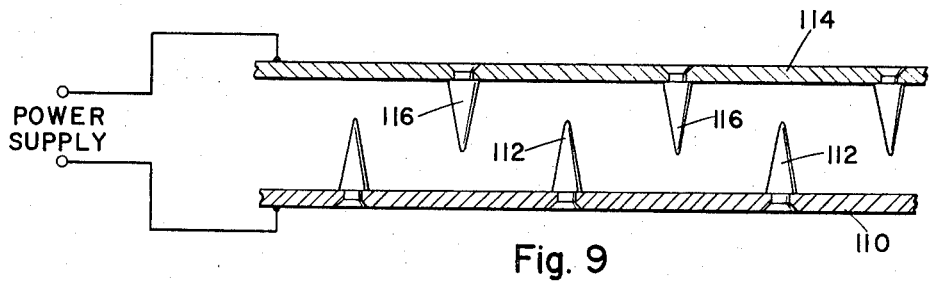
FIG. 9 is an enlarged section of the plate electrodes of FIG. 8.

For some purposes it may be necessary to apply the electrical current inside the food to avoid uneven cooking due to skin effect, particularly with moist products of poor conductivity such as vegetables. This is accomplished by means of special plate electrodes shown in FIGS. 8 and 9. The lower plate 110 is similar in configuration to plate 24, but has upwardly projecting spiked pins 112 fixed therein at spaced intervals. The pins may be attached in any suitable manner, such as by rivetted heads as shown. Upper plate electrode 114 is similar to plate 72, with downwardly projecting pins 116, spaced to fit between pins 112 and avoid direct contact. To prevent short circuiting, the upper plate 114 has a peripheral bead 118 slightly deeper than the length of pins 116, and coacted with an insulative sheath 120. Electrical current will thus pass through a food product between the plates and between the pins within the food.

Figure 10:
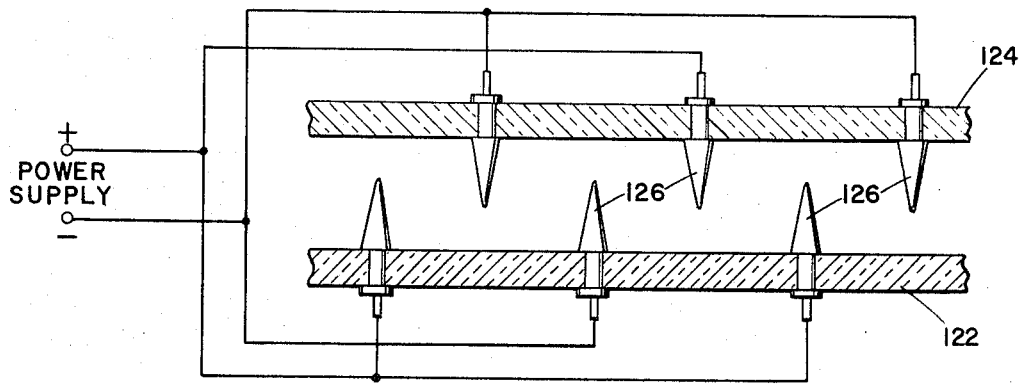
FIG. 10 is an enlarged section of a further type of electrode, showing special electrical connections.

A further configuration, shown in FIG. 10, uses a lower plate 122 and an upper plate 124 of heat-resistant insulative material such as Pyrex, in which conductive pins 126 are embedded or otherwise attached. Insulation between pins allows alternate pins in each plate to be connected to opposite sides of a DC power supply, as indicated. By this means electrical current is caused to pass in many paths through the food.

It should be understood that other plates with ribs or special surface configurations may be used.

Having described my invention, I now claim:

1. Cooking apparatus, comprising,
   a lower unit housing having an insulated frame with a lower plate removably mounted therein, at least a portion of said lower plate being conductive,
   an upper unit housing having an insulated frame with an upper plate removably mounted therein, at least a portion of said upper plate being conductive,
   each of said insulated frames having releasable catches holding the respective plate therein,
   stop means interengaging between said housing units to separate the conductive portions of said plates from direct contact,
   said upper unit being hinged to said lower unit and being vertically adjustable thereon,
   and connecting means for connecting a source of electrical power between the conductive portions of said plates.

2. Cooking apparatus according to claim 1, wherein said lower plate is downwardly recessed, and said upper plate protrudes downwardly to fit into said lower plate.

3. Cooking apparatus according to claim 2, wherein said upper plate has a downwardly projecting insulated bead for spacing the conductive portion thereof from said lower plate.

4. Cooking apparatus according to claim 1, and including radiant heating means in each of said housings adjacent the plates.

5. Cooking apparatus according to claim 4, wherein said connecting means includes switch means for connecting the source of electrical power selectively to said plates and said radiant heating means.

6. Cooking apparatus according to claim 5, wherein said connecting means includes means for selectively supplying alternating current and direct current from said source of electrical power.

7. Cooking apparatus according to claim 3, wherein said plates have interfitting conductive pins projecting therefrom.

8. Cooking apparatus according to claim 7, wherein said pins are insulated from said plates, and alternate pins in the plates are connected to opposite sides of a direct current circuit.

9. Cooking apparatus according to claim 3, and including at least one disposable conductive tray removably seated in said lower plate.

* * * * *